United States Patent Office 3,068,468
Patented Dec. 11, 1962

3,068,468

METHOD AND APPARATUS FOR DETERMINING MISDISTANCE WHEN SHOOTING AT MOVING AERIAL TARGETS

Max Bretscher, Frank Farner, Hans Isch, and Hans Klauser, all of Zurich, Switzerland, assignors to Albiswerk Zurich A.G., Zurich, Switzerland, a corporation of Switzerland Filed Oct. 22, 1959, Ser. No. 847,963
Claims priority, application Switzerland Oct. 22, 1958
10 Claims. (Cl. 343—7.3)

Our invention relates to a combined radar and photographic method and apparatus for determining misdistance (aiming error or missile off-position) when shooting at moving aerial targets.

For measuring misdistance, a picture of the position of the missile, relative to the target at the moment when the missile is expected to penetrate the target plane normal to the sighting direction, can be taken by a camera from the shoot-off point. Then the spacing of the missile from the target in the picture represents a direct measure of the misdistance. The method is applicable for direct shooting at the target as well as for shooting at a displaced target or aiming point.

The most difficult problem with such methods of ballistic measuring is the accurate determination of the moment at which the missile penetrates the target plane. In certain cases, this moment must be predetermined, for example if the release of the camera shutter involves appreciable delay (shutter delay) or if a comparison of the distances between target and missile from the measuring point cannot be carried out at this particular moment.

When shooting at an aiming point displaced from the target, there is the possibility of automatically tracking the target and the missile by respective directed radar beams and releasing the camera shutter at the moment when the respective distances are equal. In certain cases, for example when using a camera with electronic release, the shutter delay can be reduced to a negligibly slight value so that the misdistance can be determined with a high degree of accuracy. This expedient, however, fails when shooting directly at the target, because the radar echo from the target would already commence to interfere with the missile echo when distance equality is reached only approximately.

According to another known method, not involving the above-mentioned disadvantages, the flying time of the missile from the shoot-off moment to the moment of penetration through the target plane is computed on the basis of the continuously determined target coordinates and the ballistic parameters, the coordinates being obtained with the aid of radar apparatus automatically tracking the target. In this manner, the misdistance can be determined also when directly shooting at the target. However, the computation of the missile flying time is always inaccurate because of indeterminate influences so that the results do not permit a reliable conclusion as to the hitting position of the missile.

It is an object of our invention to afford a way of more accurately determining misdistance when shooting at moving aerial targets and avoiding the above-mentioned disadvantages of the prior methods not only when directly shooting at the target but also when shooting at a displaced aiming point.

According to one of the features of our invention, we proceed by registering the time point in which the missile penetrates a predetermined auxiliary plane which extends parallel to the target plane at a given relatively small distance ahead of the target plane, and we effect the automatic release of the photographic camera at that moment or in a given time relation thereto.

The main advantage, in comparison with the method based upon computation of the missile flying time, resides in the fact that the location at which the passage of the missile is observed as to time, is shifted from the shoot-off location (gun mouth) into the immediate vicinity of the target. As a consequence, the accuracy of the result is only negligibly influenced by errors occurring with respect to any necessary computation of the time required for the missile for travelling the short distance between auxiliary plane and target plane.

Like the known methods mentioned above, the invention requires the use of radar apparatus whose directed beam automatically tracks the target, as well as a picture camera whose shutter is automatically released a predetermined moment after the missile is shot off. However, aside from the radar receiving channel for responding to the target echo to track the target as regards angular position and distance, the radar apparatus according to the invention is provided with a second receiving channel for response to the missile echo. The second receiving channel is connected with a distance gating and discriminating circuit for blanking the echo and for determining the time coincidence when the missile echo passes through the distance gate. The distance gate of the second channel is timed to operate a predetermined interval of time ahead of the distance gate which appertains to the first receiving channel and serves for the target-distance follow-up control; and the discriminator coordinated to the distance gate of the second receiving channel is effective to initiate the release of the camera shuter.

The invention will be further explained with reference to the diagrams of embodiments illustrated by way of example on the accompanying drawings in which—

Figure 7:
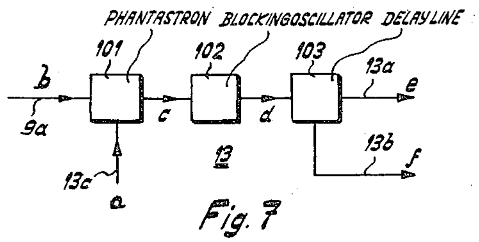
FIG. 7 is a detailed block diagram of the phase-shifter in FIG. 4.
Figure 8:
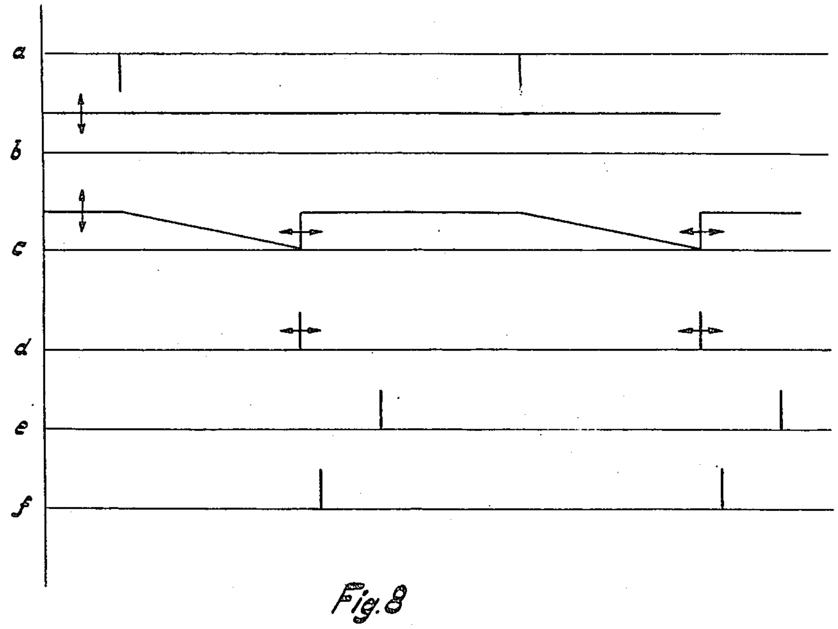

FIG. 8 graphically illustrates the operation of FIG. 7 in terms of six curves *a, b, c, d, e* and *f*.

Figure 4:
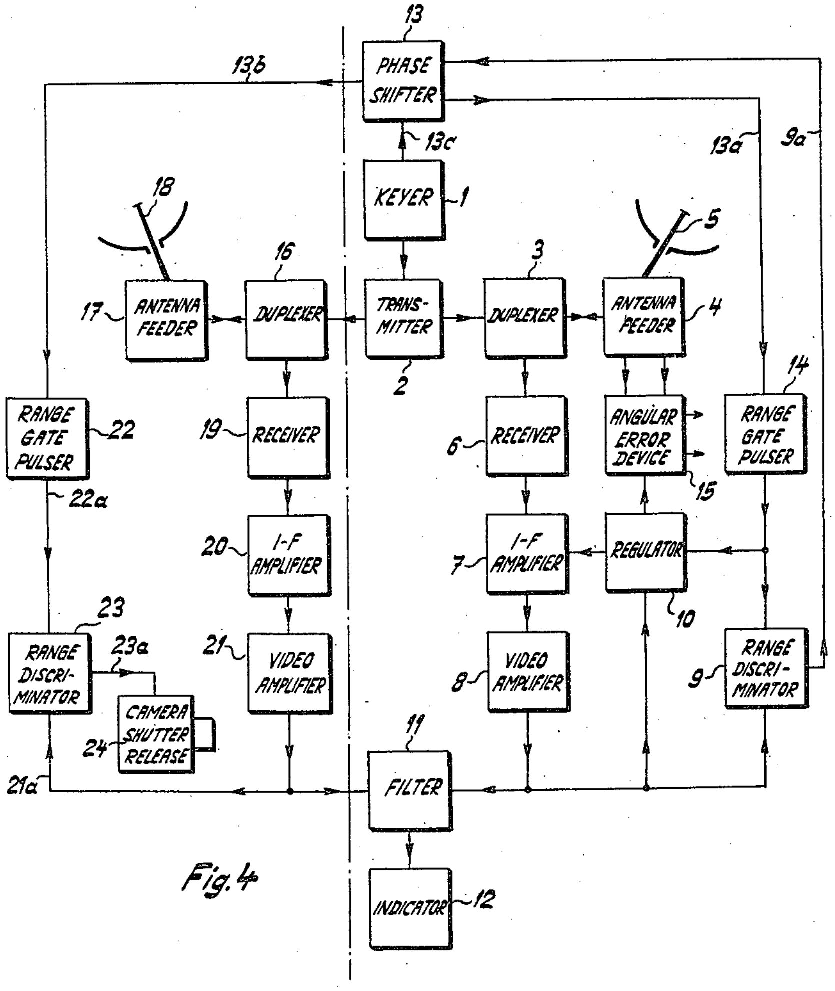
FIGS. 4, 5 and 6 show respectively the block diagrams of different systems according to the invention.
Figure 9:
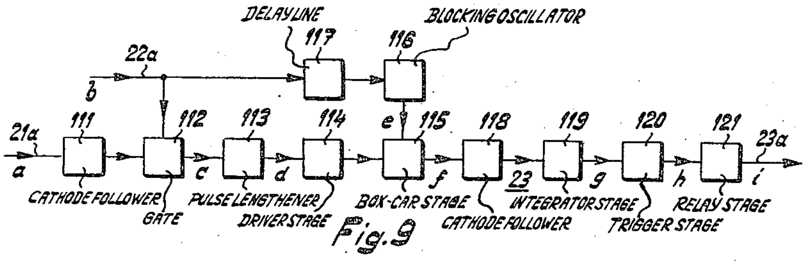

FIG. 9 is a detailed block diagram of the discriminator in FIG. 4.

Figure 10:
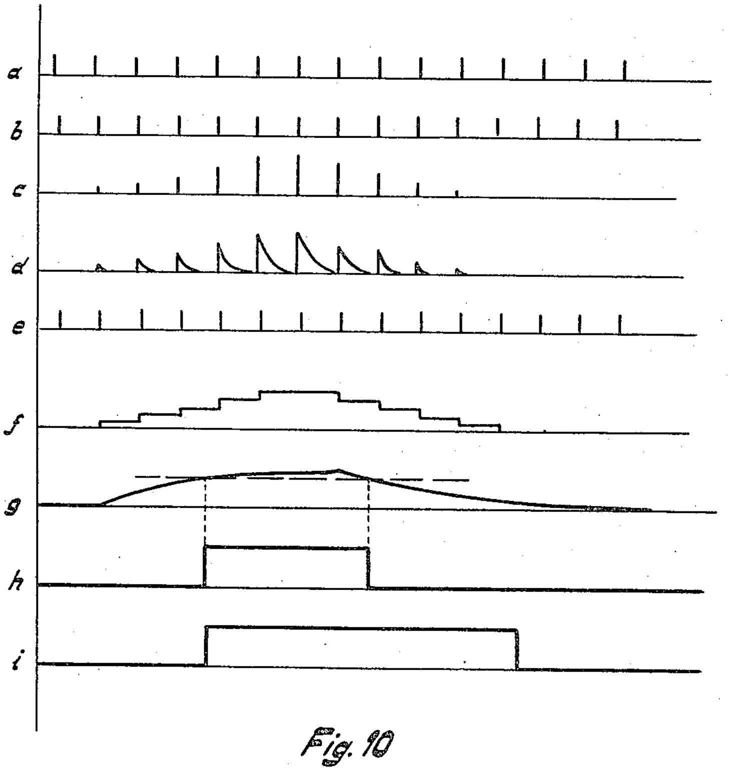

FIG. 10 graphically illustrates the operation of FIG. 9 by nine curves *a, b, c, d, e, f, g, h* and *i*.

Figure 5:
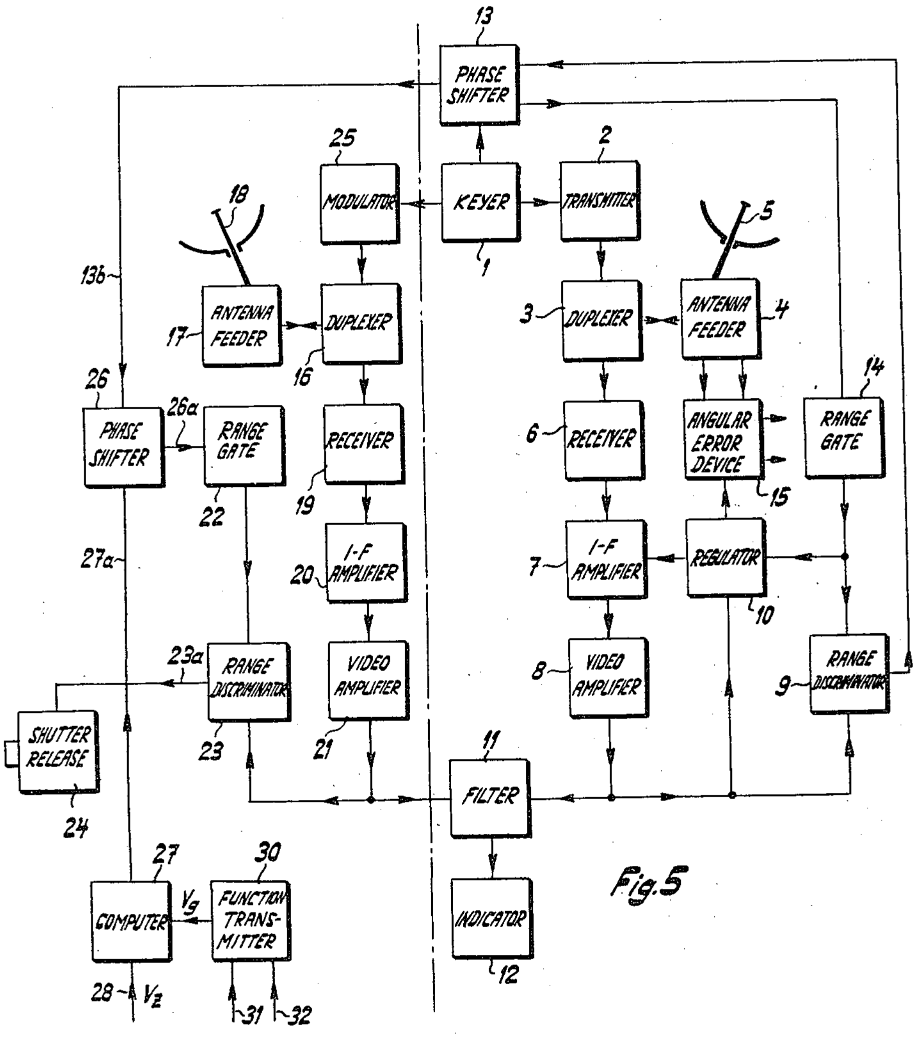
Figure 11:
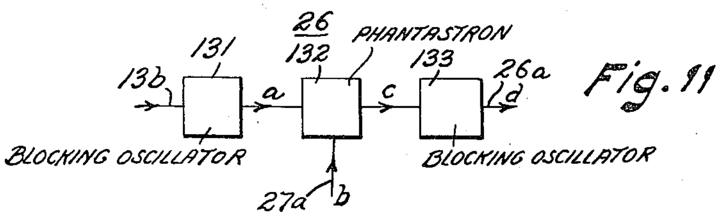

FIG. 11 is a detailed block diagram of the controllable phase shifter in FIG. 5.

Figure 12:
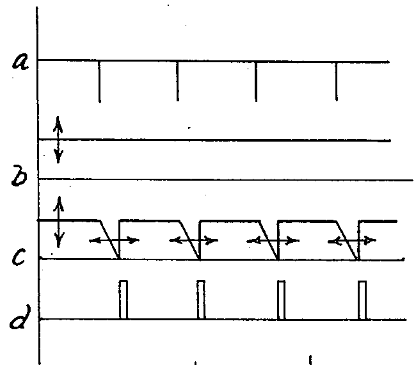

FIG. 12 graphically illustrates the operation of FIG. 11 by four curves *a, b, c* and *d*.

Figure 6:
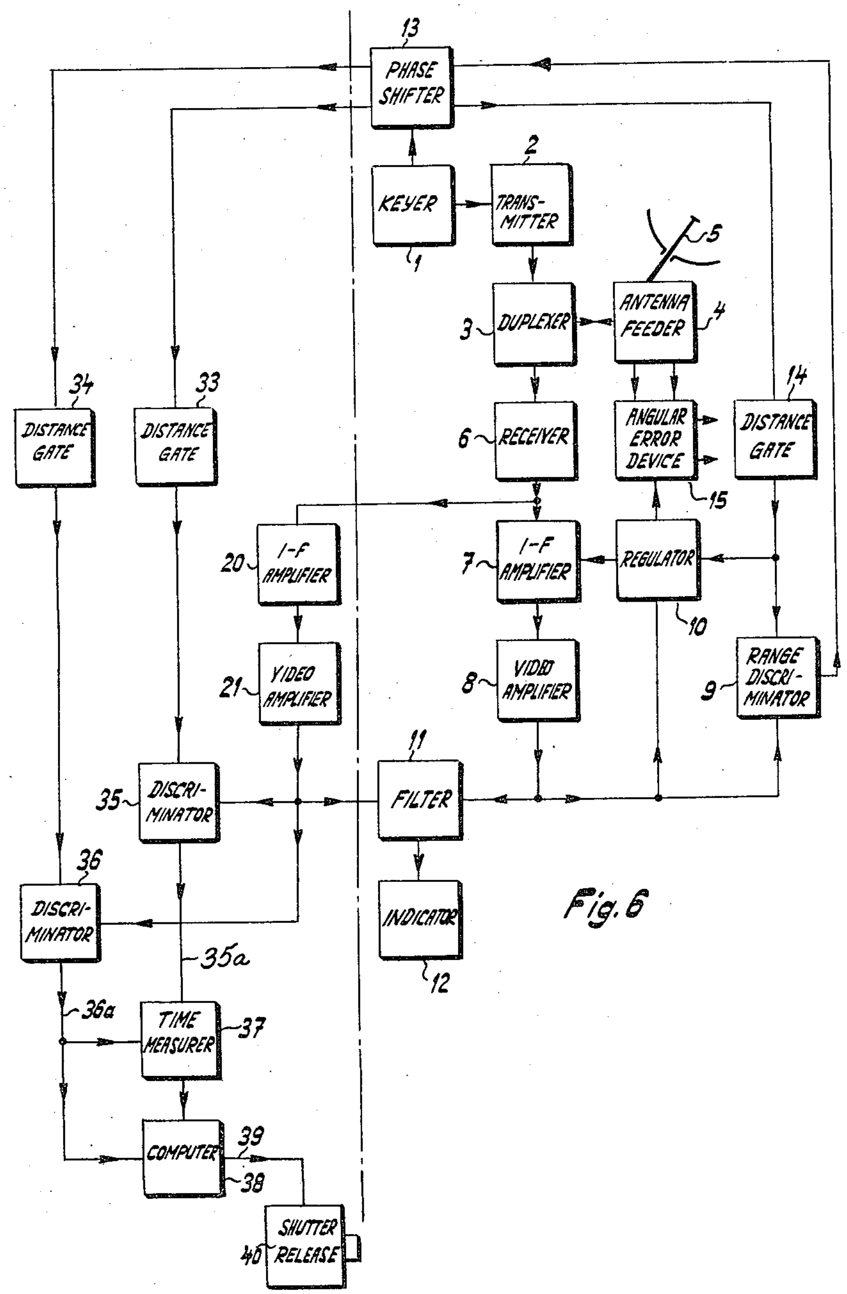
Figure 13:
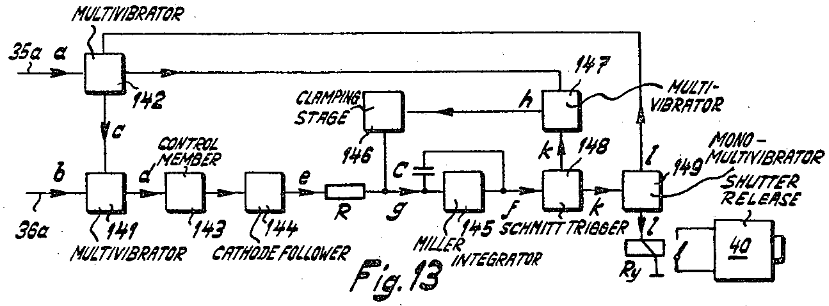

FIG. 13 is a detailed block diagram of the timing device and the computing device in FIG. 6.

Figure 14:
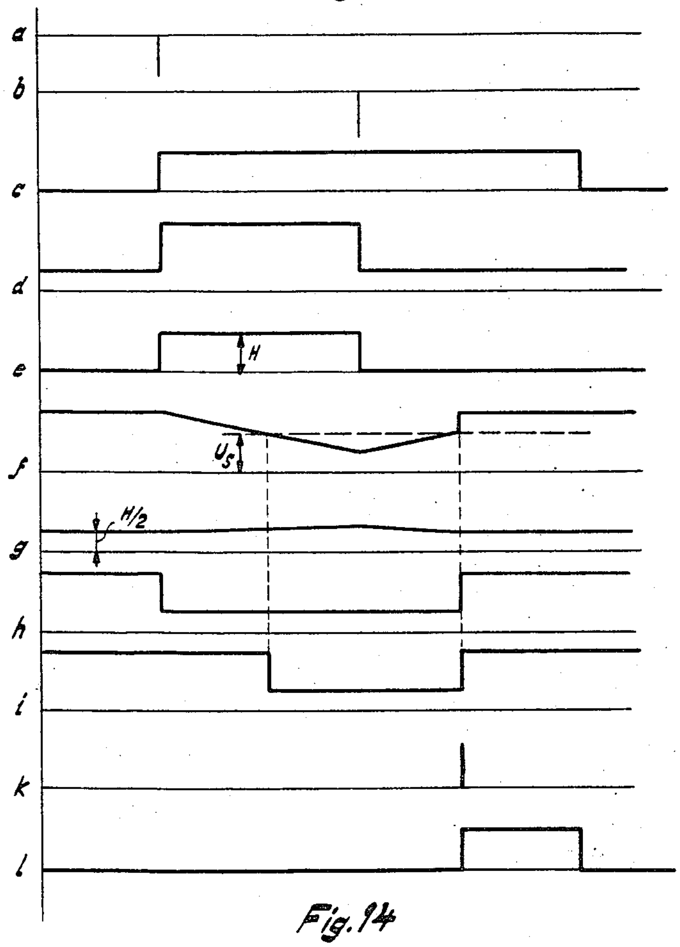

FIG. 14 graphically illustrates the operation of FIG. 13 by eleven curves *a, b, c, d, e, f, g, h, i, k* and *l*.

Figure 15:
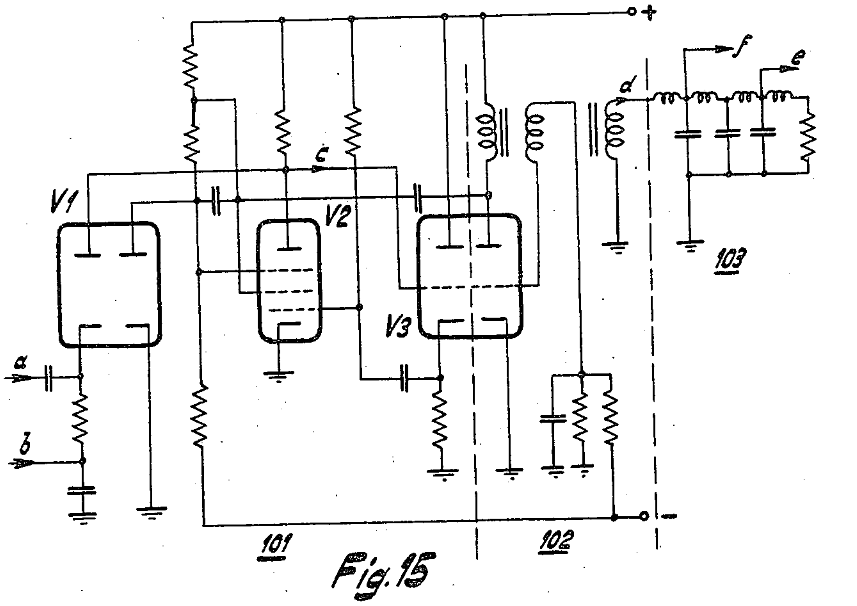

FIG. 15 is a detailed schematic circuit diagram of the phase shifter in FIG. 4 and FIG. 7.

Figure 16:
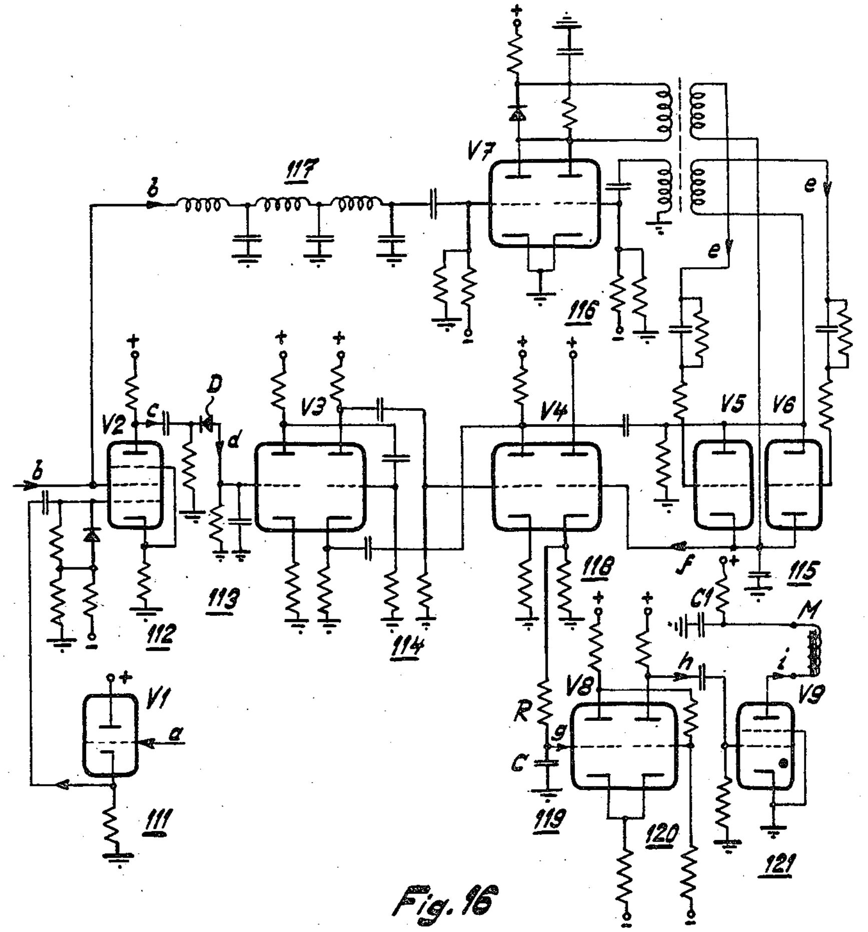

FIG. 16 is a detailed schematic circuit diagram of the discriminator of FIG. 4, also shown as a block diagram in FIG. 9.

Figure 17:
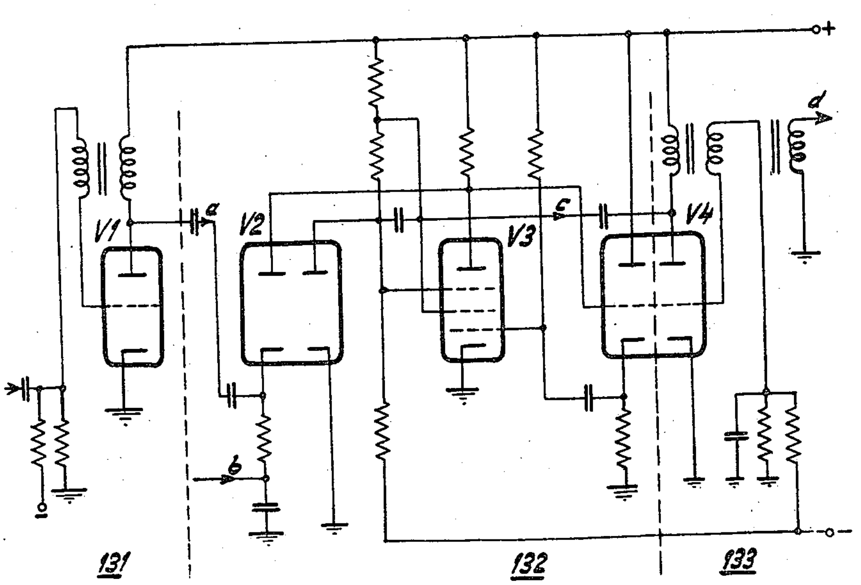

FIG. 17 is a detailed schematic circuit diagram of FIG. 11; and

Figure 18:
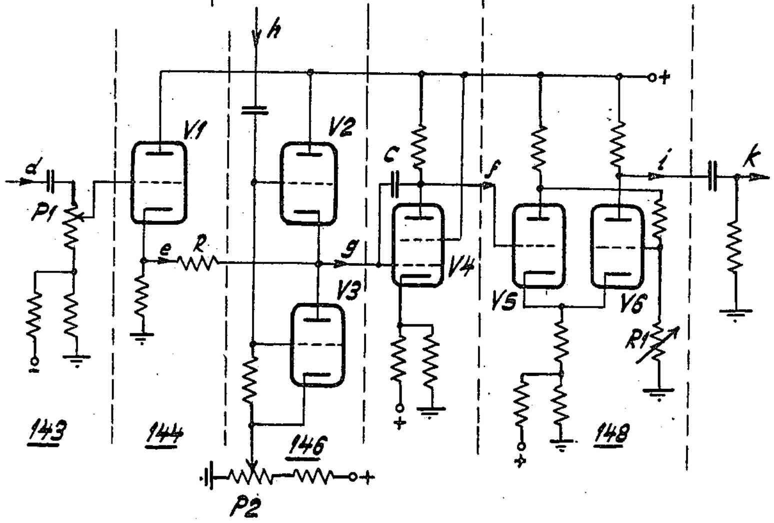

FIG. 18 is a detailed schematic circuit diagram of some of the stages in FIG. 13.

Figures 1, 2:
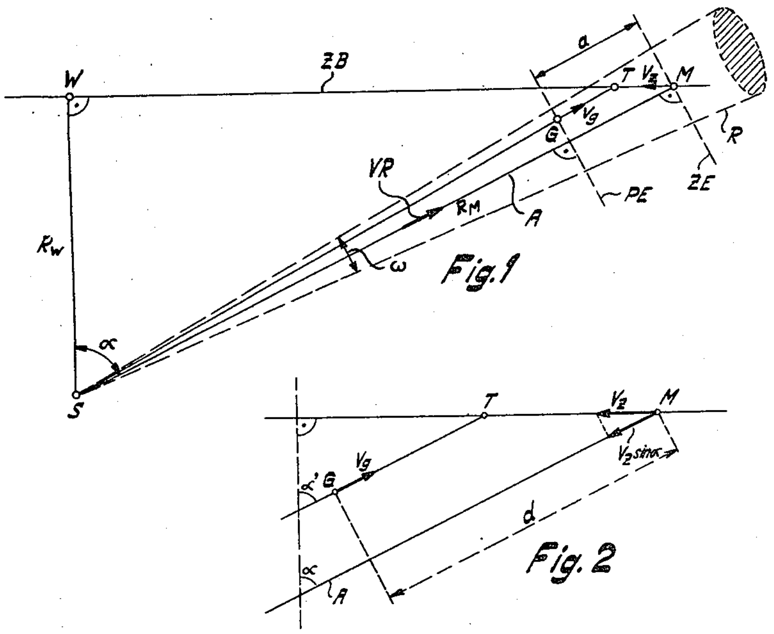
FIGS. 1 and 2 are explanatory diagrams relating to one way of performing the method of the invention.

FIG. 1 shows graphically the shoot constellation when shooting at an aerial target in horizontal linear flight of constant velocity past the observation and shoot-off point S. The plane of illustration is determined by the trajectory ZB and the observation point S where the gun or other missile ejector, the radar equipment and the photogrpahic camera are set up. At the overhead point W, the flying target has minimum distance from the observation point S. Denoted by T is the point of incidence at which the target is to be hit by the missile G, and M denotes the measuring point which determines the sighting or aiming direction VR. Denoted by ZE is the aiming plane (target plane) extending at a right angle to the sighting direction VR, and PE indicates the auxiliary plane extending parallel to the plane ZE and in proximity thereto, the spacing between planes PE and ZE being denoted by *a*. The directional radar beam, whose axis A coincides with the sighting direction VR covers a lobe angle $\omega$ and, like the optical axis of the camera, is always directed onto the target by the automatic tracking devices of the radar system. The graphic illustration in FIG. 1 fixes a time point in which the missile G penetrates the auxiliary plane PE at the missile speed $v_g$. At this moment, the target, arriving with the velocity $v_z$, is located at the measuring point M.

The interval of time required for the missile to pass through the distance from the point of penetration G in FIG. 1 to the hitting point T, of course, must always be equal to, or greater than, the interval of time reguired for releasing the camera shutter to permit taking a picture at the moment in which the missile penetrates the target plane ZE. The distance of the missile from the measuring point M at the moment of shutter release is hereinafter designated by *d* and called the "releasing distance." This distance *d* can be calculated on the basis of FIG. 2. With the permissible approximation $\alpha'=\alpha$, the following equation applies:

$$d=t_v.v_r=t_v(v_g+v_z \sin \alpha)=t_v\left(v_g+v_z\sqrt{1-\left(\frac{R_W}{R_M}\right)^2}\right)$$

In this equation, $t_v$ denotes the shutter delay, $v_r$ the relative speed between missile and target in the sighting direction, $R_W$ the distance of the overhead point W from the origin S, and $R_M$ the distance of the measuring point M from the origin S at the releasing moment. For $v_g=1000$ m./s. (assumed to be constant over the distance *d*), $v_z=300$ m./s. and $t_v=30$ ms., there results for $R_M=R_W$ a releasing distance *d* of 30 m. When increasing the measuring-point distance $R_M$, the missile velocity $v_g$ decreases and the radial component $v_z \cdot \sin \alpha$ of the target velocity, which enters into the calculation, increases when the target approaches the measuring point, so that the influences of $v_g$ and $v_z \cdot \sin \alpha$ partially compensate each other with respect to the magnitude of the releasing distance.

When shooting at a displaced aiming point, one may choose $a=d$, i.e. the distance between the target plane ZE and the parallel auxiliary plane PE can be so chosen that the photographic picture is released at the same moment at which the missile penetrates the parallel plane PE, provided the relative velocity $v_r$ at the penetrating moment is known. Depending upon the magnitude of the permissible measurig error, the following two ways are available for taking the relative velocity $v_r$ into consideration. One way is to keep the distance *a* invariable within a given range of possible relative velocities, and to insert a median value of the relative velocity $v_r$ in substitution for the term *d*, into the above equation. The other way affords obtaining greater measuring accuracy and consists in varying the distance *a* between target plane and auxiliary plane in accordance with the continuously computed relative velocity.

The conditions are somewhat different for shooting directly at the target. The target as well as the missile, at the moment of the measuring operation represented in FIG. 1, are presumed to be both in one and the same directional radar beam. To prevent the much stronger target echoes from affecting the response to the missile echoes, the distance gates used for blanking the target echo and the missile echo respectively must not coincide with each other. This means that with a width of the distance gates, for example of ±90 m. (in terms of distance), the median spacing *a* between these two gates must be at least 180 m. Under these conditions, and with a releasing distance $d=30$ m. according to the foregoing example, the release of the camera shutter cannot take place at the moment at which the missile passes through the auxiliary parallel plane PE, but must occur much later. Since further the relative velocity assumed for determining the penetrating moment cannot be assumed to be constant due to the relatively great distance from the hitting point T, a corresponding correction would have to be made. However, such a correction may make little sense in view of the error which must be taken into account in the computation of the relative velocity and which, in some cases, may be greater than any occurring correction value.

Now, according to the invention, more accurate results in determining misdistance for direct-target shooting are obtained by measuring the relative velocity $v_r$ in the vicinity of the target. For this purpose, a second auxiliary plane is assumed to extend parallel to the target plane, satisfying the condition that the two parallel auxiliary planes have a fixed spacing from each other and from the target plane ZE. In this manner, the time elapsing while the missile passes through the distance between the two parallel auxiliary planes can be measured, and the median relative velocity $v_r$ in this range can be directly computed from that interval of time.

Figure 3:
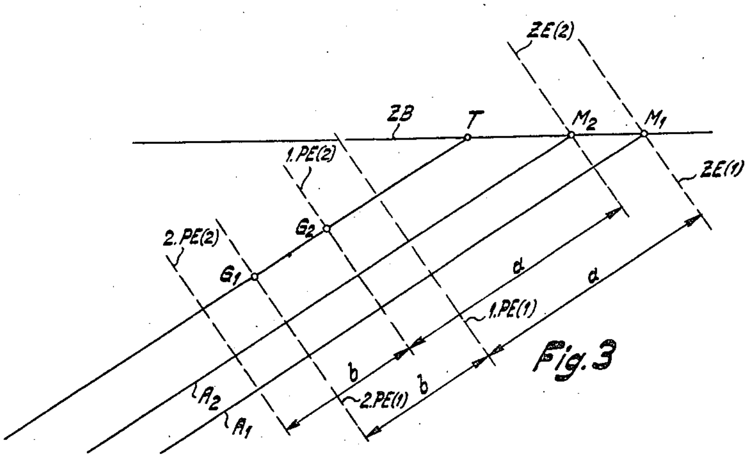
FIG. 3 is a modified portion of a diagram according to FIG. 1 and relates to a second way of performing the novel method.

FIG. 3 represents graphically the shoot constellation for the two measuring points $M_1$ and $M_2$ serving for the computation of the just-mentioned travel time. The missile first penetrates the above-mentioned second auxiliary plane 2PE and somewhat later the first auxiliary plane 1PE. During this interval of time the target travels from measuring point $M_1$ to measuring point $M_2$. The coordinated positions of the aiming plane ZE and the two auxiliary parallel planes 1PE and 2PE are designated by suffixes in parentheses, namely (1) and (2). Denoted by *a* is the distance of the first parallel plane 1PE from the target plane ZE, and by *b* the distance of the same auxiliary plane from the second parallel plane 2PE. The point of missile penetration $G_1$ in auxiliary plane 2PE coincides in time with measuring point $M_1$, and the point of penetration $G_2$ in auxiliary plane 1PE coincides with measuring point $M_2$. For a travel time *t*, the relative velocity is given by the value $$v_r=\frac{b}{t}$$

This permits claculating, from the formula $d=t_v \cdot v_r$, the releasing distance and, from the difference $a-d$, the interval of time by which the release of the camera shutter must be delayed counting from the moment of penetration point $G_2$.

Referring to the block diagrams of apparatus for performing the above-described method of the invention illustrated in FIGS. 4 to 6, it should be understood that the portion of the radar installation required for the automatic tracking of the target is indicated on the right-hand side of the vertical dot-and-dash line, this portion of the automatically tracking radar being the same in all three examples and in accordance with prior art tracking devices of this type. This known portion of the installations will first be briefly described, a detailed description of this portion being available in vol. 23 of MIT Radiation Laboratory Series, pages 380 to 416.

An oscillator or keyer 1 controls the radar transmitter 2 which passes its high-frequency pulses through a duplexer 3 to the antenna feeder system 4 whose directional radar antenna 5 radiates the pulses into space. The echo pulses received by the same antenna 5 pass through the duplexer 3 to the radar receiver 6 which translates the high-frequency pulses into intermediate-frequency pulses and subjects them to pre-amplification. This receiving channel comprises an intermediate amplifier 7 with automatic gain control in which the echo pulses are rectified before being applied to a video amplifier 8. The video signal is supplied to a range (distance) discriminator 9, also to a regulating stage 10, and through a filter stage 11 to the radar indicator 12.

A phase shifter 13 controlled in accordance with the error voltage occurring in the discriminator 9, receives pulses from the keyer 1 and passes phase-displaced pulses, synchronous with those for controlling the transmitter 2, to a range-gating pulser 14 which produces the distance gating pulses serving for blanking the echo in the distance discriminator 9. The distance gating pulses are applied to a regulator stage 10 for controlling it so that the regulating voltage supplied to the intermediate-frequency amplifier 7 is effective only when a target echo is being received. Also obtained in the regulator stage 10 is the modulation voltage which is impressed upon the video signal by the circulating movement of the directional radar beam, and this modulating voltage is compared in an angular error device or comparator 15 with the reference voltages furnished from the antenna feeder stage 4 for producing the angular-error voltages.

Shown at the left of the vertical dot-and-dash line in FIGS. 4, 5 and 6 are the additional means provided for establishing the time point at which the camera shutter is released in respectively different cases of application and operation.

The device shown in the left-hand portion of FIG. 4 is particularly designed for measuring the projectile off-positions (misdistance) when firing at a displaced aiming point. The transmitter 2 feeds through another duplexer 16 a second antenna feeder stage 17 whose directional antenna 18 is not aimed at the target but at a point presumed to be displaced a given lateral angle, for example 180°. For ascertaining the echo pulses reflected from the projectile fired at the presumed aiming point, a separate receiving channel is provided which, similar to the tracking-radar receiving channel, comprises a receiver 19 with a mixer and a pre-amplifier stage, an intermediate-frequency amplifier 20 including a rectifier stage, and a video amplifier 21. The I-F amplifier 20 of this second receiving channel, however, is not provided with automatic gain control because the projectile echo, even at short distances, is only weakly distinguished from the noise level so that an excessive gain of the second receiving channel need not be expected. A distance (range) gating stage 22 produces the distance gate for blanking the projectile echo. In the present example, the range gating pulser is located a given time spacing ahead of the distance gate produced in the stage 14. For this purpose the range gate pulser 22 receives control pulses through a line 13*b* from the phase shifter 13, these control pulses being shifted a fixed phase angle ahead of the control pulses transmitted to the range gating pulser 14. A range discriminator stage 23 determines the time coincidence when the projectile echo signal, coming from the video amplifier 21 passes through the distance gate and, in the event of coincidence, produces a pulse which passes through the discriminator outlet line 23*a* directly to the camera shutter device 24 for releasing the shutter. In order to also obtain a visual image of the projectile echo, a video signal obtained in the second receiving channel is supplied through the separating (filter) stage to the oscillograph indicator 12 common to both component radar systems.

The phase displacement between the distance gates of the two receiving channels in the above-described apparatus according to FIG. 4 is given a fixed setting. This corresponds to a fixed distance $a$ between the aiming plane ZE and the auxiliary parallel plane PE (FIG. 1). However, since the relative velocity between target and projectile varies in dependence upon the shoot constellation, and hence is not constant, there occur measuring errors whose significance will be apparent from the following computed results.

Assume that the target is approaching on a horizontal line of flight at constant speed magnitude and direction. Further assume that the target speed is $v_z$=300 m./s., the initial projectile speed $v_{g0}$=1000 m./s., and the shutter delay of the camera $t_v$=30 ms., and that the constant distance between target plane and parallel plane is chosen as $a$=27 m., which corresponds to the condition that the measuring error becomes zero at the overhead point W (FIG. 1) vertically spaced from the observation point a distance of $R_W$=500 m. Under these conditions, the lateral positional error (misdistance) within a range of distance $R_W$ between 500 and 2000 m. is within the limits of +2% and −1% (artillery per mil). The largest departures, of course, occur at, or immediately ahead of, the reversing (overhead) point W. With a shutter delay interval $t_v$=97 ms. and a correspondingly larger distance between target plane and parallel plane ($a$=90 m.) and otherwise the same conditions, the lateral positional error varies within the limits of +5% . . . −2%. The errors in elevation angle (measured perpendicularly to the direction of flight) are negligibly slight in comparison with the stated values of the lateral angular errors. The foregoing error limits apply only to approaching flight of a target. Otherwise the measuring errors in certain cases increase considerably, particularly when large distances $R_W$ of the reversing point are involved. This, however, has little significance because shooting at targets on a flight path away from the origin point is anyhow avoided as much as possible because of the greatly reduced hitting probability.

The system illustrated in FIG. 5 differs from that of FIG. 4 in that the distance $a$ between aiming and parallel planes is not given a fixed amount but is varied in accordance with the relative velocity between target and projectile, this velocity being continuously computed after the firing moment from the ballistic data and the target coordinates furnished from the radar equipment, with the result that the distance $a$ in each case is equal to the releasing distance $d$. It can be achieved in this manner that the travel time of the projectile from the auxiliary parallel plane to the target plane is always virtually equal to the shutter delay interval. This makes it possible to secure taking the photographic picture accurately at the moment when the projectile penetrates the target plane.

Aside from the components denoted by 1 through 23 in the apparatus of FIG. 4, the modified system according to FIG. 5 is provided with a separate modulating and transmitting stage 25 between the keyer 1 and the duplexer 16 of the second receiving channel, an expedient which, if desired, may also be used in apparatus as shown in FIG. 4. However, the main difference between the two systems resides in the additional means for automatically varying the phase displacement between the distance gates active in the first and second receiving channels respectively. For this purpose, the system of FIG. 5 is provided with a second phase shifter 26 which is controlled by a computer 27 for determining the instantaneous relative speed $v_r$. The second phase shifter 26 receives control pulses from the first phase shifter 13. These control pulses have a fixed median phase displacement relative to the control pulses passing from the first phase shifter 13 to the distance gating component 14; and the phase shifter 26 derives from the just-mentioned pulses a sequence of corresponding control pulses that are applied to the distance gating stage 22 of the second receiving channel and are additionally modified with respect to their phase position in accordance with the computed relative speed. The computer 27 receives at its input line 28 a signal proportional to the target speed $v_z$. This signal is produced by evaluating the target coordinates measured by the radar apparatus, for which purpose the necessary means are normally available in the known fire control radar installations. A second input line of the computer 27 supplies another signal proportional to the target speed $v_g$. This second signal issues from the function transmitter 30 to whose input lines 31 and 32 the target coordinates and the ballistic parameters are supplied.

Disregarding the decrease in projectile speed between measuring point and point of impact, which becomes more and more negligible the shorter the shutter delay of the camera, and disregarding any ballistic stray, the misdistance values can be indicated with an apparatus according to FIG. 5 theoretically free of error.

The aparatus according to FIG. 6 is designed for determining misdistance when directly shooting at a target. By supplementing this apparatus with the components 16 to 19 according to FIG. 4, it is also applicable for firing at a displaced target point.

In the embodiment of FIG. 6, the second receiving channel is branched-off behind the receiver 6 and comprises only the intermediate-frequency amplifier 20 and the video amplifier 21. For determining the two auxiliary parallel planes at fixed respective distances ahead of the target plane, the apparatus is provided with two distance gating components 33 and 34. The control pulses supplied to these respective gating stages have a fixed phase relation to each other and relative to the control pulses supplied to the distance gating component 14 of the first receiving channel.

Connected behind each distance gating component 33 and 34 is a discriminator 35 or 36 for response to time coincidence when the projectile echo passes through the distance gates. The pulses issuing from the discriminators 35 and 36 in the case of coincidence, pass to a time measuring device which measures the interval $t_b$ during which the projectile passes through the distance $b$ (FIG. 3) between the two parallel auxiliary planes. The measuring instrument 37 then supplies the computer 38 with an electric voltage or other magnitude proportional to the measured time interval. The discriminator 36, which ascertains the moment at which the projectile penetrates through the auxiliary plane closer to the target plane, likewise transmits this moment to the computer 38 which now determines the interval of time $t_B$ by which the release of the camera shutter must be delayed counting from the moment last mentioned. The releasing pulse for the camera shutter 40 is taken from the output line 39 of the computer 38.

In general, therefore, the computer must solve the following equation:

$$t_B = K\frac{a}{b}\cdot t_b - t_v$$

In this equation, the factor K additionally takes into account the change in relative speed $v_r$ along the distance $a$ in comparison with the speed along the distance $b$. The value K may be constant in order to denote the median change in relative speed. The subtrahend in the foregoing equation constitutes the interval of time $t_a$ in which the projectile travels the distance $a$ up to the target plane.

It is of advantage to so choose the ratio of the distances $a$ and $b$, with factor K assumed to be constant, that the travel intervals $t_a$ and $t_b$, on the average, are equal to each other, whereby the computation is reduced to a subtraction, thus simplifying the requirements for the computing device 38.

The measuring accuracy of the above-described apparatus according to FIG. 6 in any case of application, is greater than that obtained with the apparatus shown in FIG. 4.

While the individual components of the above-described systems according to the invention are known as such, preferred embodiments for use with the present invention will be described in detail presently.

An embodiment of the phase shifter 13 (FIG. 4) is schematically illustrated in FIG. 7. The first stage 101 of variable phase displacement is constituted by a phantastron (one-shot pulse generator) which is triggered by the pulses issuing through channel 13$c$ (FIGS. 4, 7) from the keyer 1. The delaying period of the phantastron 101 is controlled by the distance-proportional voltage supplied through line 9$a$ (FIGS. 4, 7) from the distance discriminator 9. Details of design and operation of the phantastron are described in vol. 19, page 195 and following, of MIT Radiation Laboratory Series. The phantastron 101 controls a blocking oscillator 102 whose output pulses are supplied to a time-delay line 103. The exit of the delay line 103 supplies the pulses for controlling, through connection 13$a$ (FIGS. 4, 7), the distance-gating stage 14 (FIG. 4). A tap conductor 13$b$ of the time-delay line 103 furnishes the timely advanced pulses for controlling the distance-gating stage 22 (FIG. 4).

The pulse-time diagram in FIG. 8 represents the operation of the phase-shift network according to FIG. 7. The abscissa in FIG. 8 denotes time and the ordinate, in each of the five graphs denoted by $a$ through $f$, indicates pulse amplitude. The locations at which these voltage pulses occur are analogously designated in FIG. 7 by respective letters $a$ through $f$.

FIG. 8$a$ shows the individual keying pulses supplied from keyer 1 through connection 13$c$ (FIGS. 4, 7). FIG. 8$b$ shows the distance-proportional direct voltage supplied through connection 9$a$ (FIGS. 4, 7). FIG. 8$c$ indicates the output voltage of the phantastron 101 which, when jumping back after lapse of the delaying time determined by the direct voltage, triggers the blocking oscillator 102. FIG. 8$d$ represents the output pulses of the blocking oscillator 102, FIG. 8$e$ the control pulses supplied through connection 13$a$ to the distance-gating stage 14 (FIG. 4), and FIG. 8$f$ the control pulses supplied through connection 13$b$ to the distance-gating stage 22.

The same phase-shift network is also applicable for the phase shifter 13 in the systems according to FIGS. 5 and 6.

The fundamentals of the discriminator 23 (FIG. 4) are schematically shown in FIG. 9. FIG. 10 exhibits the corresponding pulse diagrams in the same manner as explained above with reference to FIG. 8. The signal pulse (FIG. 10$a$), taken through line 21$a$ from the video amplifier 21 (FIG. 4) and containing the missile echoes aside from any noise or ground clatter, is supplied through a cathode follower 111 to a gate stage 112 which is controlled by the gating pulses (FIG. 10$b$) produced in the distance gating stage 22 (FIG. 4) and supplied through line 22$a$. Consequently, only those echo pulses (FIG. 10$c$) appear at the exit of the gate stage 112 which fully or entirely coincide with the gate pulses. When the missile echo passes through the gate, a number of pulses, for example one hundred pulses, are produced within a given interval of time, for example of 50 ms. (only some of these pulses being shown in FIG. 10$c$). This number of pulses is dependent upon the magnitude of relative speed $v_r$, the gate-pulse length and the pulse-succession frequency of the radar system. These relatively short pulses (FIG. 10$c$) appearing at the exit of gate stage 112 are prolonged in a pulse-lengthener stage 113 up to a few microseconds duration (FIG. 10$d$) and are supplied through a driver stage 114 to a box-car stage 115 which effects pulse-to-pulse lengthening. As a result, the signal appearing at the exit of the box-car stage 115 may have a duration of 50 ms., for example (according to the above-assumed travel time of the missile echo through the gate). The lengthened output signal of stage 115 is represented in FIG. 10$f$. The maximum value of this signal occurs at the moment of accurate coincidence of missile echo and gate pulse. The box-car stage 115 is controlled by the pulses (FIG. 10$e$) of a blocking oscillator 116 which is released by the gate pulses through a time-delay line 117.

The output signal (FIG. 10$f$) of the box-car stage 115 is supplied through a cathode follower 118 to an integrating stage 119 whose output signal (FIG. 10*g*) controls a Schmitt trigger 120. This trigger when becoming active supplies a signal (FIG. 10*h*) for controlling a relay stage 121. The output signal (FIG. 10*i*) of the relay stage 121 in line 23*a* triggers the electromagnetic shutter release 24 (FIG. 4) of the camera. The time constant of the integrating stage 119 is so rated that the noise or ground clatter superimposed upon the missile echo does not release the Schmitt trigger 120 and that the voltage at the integrating stage 119 can follow the increase in output signal at cathode follower 118 even when the travel time of the missile echo is short. The above-described discriminator can also be used without change in the system according to FIG. 5.

Shown in FIG. 11 is an embodiment of a controllable phase shifter as used at 26 in the system according to FIG. 5. FIG. 12 illustrates the corresponding pulse diagrams. The control pulses derived at 13*b* from the phase shifter 13 have a fixed median phase displacement relative to the pulses supplied to the gating stage 14 (FIG. 5). The control pulses synchronize a blocking oscillator 131 whose output pulses (FIG. 12*a*) release a phantastron 132. The delaying time, elapsing from the releasing moment until the phantastron switches back to quiescent condition, is substantially linearly dependent upon the controlling direct voltage (FIG. 12*b*) derived at 27*a* from the computer device 27 (FIG. 5). The sudden voltage dips (FIG. 12*c*) produced when the phantastron 132 switches back, control another blocking oscillator 133 from which the pulses (FIG. 12*d*) for controlling the distance-gating stage 22 (FIG. 5) are taken at 26*a* (FIGS. 5, 11).

The timing device 37 and the computing device 38 used in the system according to FIG. 6 are shown combined in the schematic diagram of FIG. 13. The corresponding pulse diagrams are shown in FIG. 14.

The discriminators 35 and 36 in FIG. 6 have the same design as the one according to FIG. 9, with the exception of the relay stage 121 which is not required in the system of FIG. 6). Two pulses (FIGS. 14*a*, 14*b*) are derived from the leading fronts of the rectangular signal waves (FIG. 10*h*) occurring at the exit of the Schmitt trigger 120 (FIG. 9). The time spacing of these two pulses is equal to the interval in which the missile travels the distance *b* (FIG. 3). This time interval is measured by integration of the impulse voltage of a bistable multivibrator 141. The first-occurring pulse (FIG. 14*a*) derived at 35*a* from discriminator 35 triggers the bistable multivibrator 141 to switch from quiescent to active state, whereafter the next timing pulse (FIG. 14*b*) derived from discriminator 36 returns the multivibrator to quiescent condition. The first pulse does not directly act upon the multivibrator 141 but reaches the input circuit of another bistable multivibrator 142 whose output pulse (FIG. 14*c*) controls the multivibrator 141.

The pulse voltage (FIG. 14*d*) taken from multivibrator 141 passes through a control member 143 to a cathode follower 144 which issues a pulse of the amplitude H (FIG. 14*e*) to a Miller integrator 145 comprising an integrating RC member. In the event the factor $$K\frac{a}{b}$$

in the above-presented equation for $t_B$ is equal to unity, the potential in the input circuit of the Miller integrator 145 (FIG. 14*g*) is kept at the value $H/2$, i.e. at one half of the pulse amplitude occurring at the cathode follower 144, until arrival of the first pulse. This is effected by means of an adjustable clamping stage 146. When the multivibrator 142 switches over, a third bistable multivibrator 147 is triggered from quiescent to active condition (FIG. 14*h*), whereby the clamping stage 146 is blocked and therefore the Miller integrator 145 released. This initiates the integration at the capacitor C of the Miller integrator 145. The integration terminates at the arrival of the second pulse, whereafter the capacitor C commences to discharge. Due to the above-mentioned adjustment of the starting-voltage level for the integrator 145, the respective charging and discharging time constants of the integrator are made equal.

The subtraction of the shutter delay interval $t_V$ from the measured time $t_B$ is effected by means of a Schmitt trigger 148 connected behind the integrator and having its threshold voltage value $U_s$ adjustable in dependence upon the shutter delay interval relative to the normal (quiescent) potential in the input circuit of the integrator 145. Some time after release of the integrator, the output voltage (FIG. 14*f*) of the integrator 145 drops below the threshold value $U_s$ of the Schmitt trigger 148, thus causing it to switch (FIG. 14*i*). The switching has no effect, but when thereafter the integrator switches back, due to the integrator output voltage again increasing above the threshold value, a pulse (FIG. 14*k*) is produced which releases a monostable multivibrator 149 and returns the bistable multivibrator 147 to quiescence.

The output pulse (FIG. 14*h*) of the multivibrator 149 controls a relay Ry for releasing the camera shutter. The rear edge of the pulse wave returns the bistable multivibrator 142 to quiescence. Due to the intercoupling of multivibrators 142 and 149, the integrator 145 is released for another cycle of operation only after a shoot measuring performance, including the taking of a picture by the camera, is completed. When the multivibrator 142 switches back, the clamping stage 146 again becomes active, thus establishing the quiescent level of potential at the entrance of the integrator 145 until arrival of the next missile echo.

FIG. 15 is a detailed circuit diagram of the phase shifter 13 (FIG. 4) whose basic design and operation are explained above with reference to FIGS. 7 and 8. The reference characters in FIG. 15 correspond to those in FIGS. 7 and 8.

The tubes V1, V2 and the first half-portion of the twin tube V3 form together the phantastron stage 101. The second portion of tube V3 operates as blocking oscillator (102). The delay line 103 is composed of inductance coils and capacitors.

FIG. 16 is a detailed circuit diagram of the discriminator 23 (FIG. 4) whose fundamental design and operation are explained above with reference to FIGS. 9 and 10. The reference characters in FIG. 16 correspond to those in FIGS. 9 and 10.

The cathode follower 111 comprises the tube V1. The gate stage 112 comprises the tube V2. The pulse prolongation (stage 113) is effected by the coupling comprising the diode D. The driver stage 114 comprises the tube V3 and the first half-portion of the twin tube V4. The box-car stage 115 with tubes V5 and V6 stores the pulse voltage during a pulse period, and is opened each time after blocking-out of the video signal. Used for this purpose is the blocking oscillator 116 with the tube V7. The cathode follower 118 is formed by the second portion of the twin tube V4. The integrating member 119 consists of a resistor R and a capacitor C. It operates to smooth the fluctuations caused by receiver noise, so that the Schmitt trigger 120 (tube V8) is not released even by large noise peaks. However, when an echo pulse occurs in the gating stage 112, the voltage at capacitor C of integrating member 119 immediately increases, and the Schmitt trigger 120 is released. This ignites the thyratron V9 of the relay stage 121, and the capacitor C1 discharges through the magnet coil M of the camera shutter release. The time delay line 117 is composed of inductance coils and capacitors.

FIG. 17 is a detailed circuit diagram of the controllable phase shifter 26 (FIG. 5) whose fundamental design and operation are explained above with reference to FIGS. 11 and 12, the reference characters in FIG. 17 being the same as those used in FIGS. 11 and 12 for corresponding elements.

The tube V1 operates as a blocking oscillator (131). The phantastron 132 and the blocking oscillator 133 with tubes V2, V3 and V4 have the same connection as the corresponding stages 101 and 102 in FIG. 15.

FIG. 18 is a detailed circuit diagram of the essential stages 143, 144, 145, 146 and 148 of the block diagram illustrated in FIG. 13, the same reference characters being used.

The regulating member 143 comprises a potentiometer P1 for setting the pulse voltage H (FIG. 14*e*) at the exit of the cathode follower 144 comprising the tube V1. The clamping stage 146 cooperates with the two tubes V2 and V3. The potentiometer P2 permits adjusting the quiescent input potential $H/2$ (FIG. 14*g*). The tube V4, together with the resistor R and the capacitor C, constitutes the known Miller integrator. The voltage threshold value $U_s$ (FIG. 14*f*) of the Schmitt trigger 148, comprising the tubes V5 and V6, is adjustable by means of a variable resistor R1.

When the factor $$K\frac{a}{b}$$

in the above-mentioned equation for $t_B$ differs from unity, the pulse amplitude H (FIG. 14*e*) or the voltage threshold value $U_s$ of the Schmitt trigger 148 can be correspondingly varied without change in quiescent potential at the entrance of integrator 145.

We claim:

1. The method of measuring misdistance when shooting at moving aerial targets, which comprises aiming a camera from the shoot-off point in the shoot-sighting direction for taking a picture of the missile position relative to the aiming point in the target plane normal to the sighting direction, defining a given auxiliary plane closely ahead of and parallel to said target plane, determining the moment when the missile penetrates the given auxiliary plane, and releasing the camera shutter in time-dependence upon said moment, whereby the pictured distance between missile and target is a measure of misdistance.

2. The method of measuring misdistance according to claim 1 when aiming at a displaced target point, which comprises providing a sensing zone corresponding to the position of the auxiliary plane, adjusting the sensing zone for giving the spacing between the target plane and the auxiliary plane the magnitude, depending upon the relative velocity between missile and target and the shutter delay, required for releasing the shutter at said moment when the missile penetrates said auxiliary plane.

3. The method of measuring misdistance according to claim 2, which comprises adjusting the sensing zone for giving said inter-plane spacing a fixed magnitude in accordance with permissible limit of measuring error, whereby the measured misdistance remains within said error limit for any relative missile-target velocities within a given range.

4. The method of measuring misdistance according to claim 1 when aiming at a displaced target point, which comprises continuously measuring the relative velocity between missile and target and providing a sensing zone corresponding to the position of the auxiliary plane, adjusting the sensing zone so as to vary said spacing between the target plane and auxiliary plane in dependence upon said relative velocity.

5. The method of measuring misdistance according to claim 1, which comprises defining a second auxiliary plane parallel to said first-defined auxiliary plane so that both auxiliary planes are shortly ahead of and parallel to the target plane at fixed and different respective distances therefrom, measuring the time elapsing while the missile is travelling from one of the auxiliary planes to the other of the auxiliary planes, for determining the velocity of the missile in the vicinity of the target plane, and releasing the camera shutter upon lapse of a given delay interval after the moment when the missile penetrates the one auxiliary plane closer to the target plane.

6. The method of measuring misdistance according to claim 5, wherein the distance between said two auxiliary planes and the distance between said target plane and the closer auxiliary plane are equal in terms of the respective median time interval of missile travel.

7. Apparatus for measuring misdistance when shooting at moving aerial targets, comprising an automatic tracking radar system having a directional tracking beam and having a first receiving channel for target echoes, echo-responsive control means for tracking the target as to angular and range coordinates, said range tracking control means being connected with said first channel and comprising a range gating stage, said radar system having a second receiving channel for missile echoes, a second range gating stage and a discriminator stage being connected with said second channel for echo blanking and responding to time coincidence when the missile echo passes through said second gating stage, phase shift means connected with said first and second gating stages to activate said second gating stage a predetermined time spacing ahead of said first gating stage, a camera for taking a picture of the target-missile constellation, said camera being connected with said radar system to be trained together with the tracking beam and having a shutter of a given shutter delay, said discriminator being connected with said shutter for releasing it in response to time coincidence in said second gating stage.

8. Apparatus for measuring misdistance when shooting at moving aerial targets, comprising an automatic tracking radar system having two directional antennas displaced from each other a given lateral angle and trained at the target and in the shooting direction respectively when in operation, radar pulse transmitter means connected with said two antennas for simultaneous pulse issuance therefrom, a first receiving channel for target echoes connected with said target-tracking antenna, a second receiving channel for missile echoes connected with said other antenna, a range gate and a range discriminator connected with each of said respective two channels for response of said discriminator to occurrence of a given time coincidence of the echo passing through the gate, phase shift means connecting said transmitter means with said two gates for opening the missile-echo gate ahead of the target-echo gate, and means for varying the time spacing of said two gates in accordance with the relative speed between missile and target, a camera for taking a picture of the target-missile constellation, said camera being connected with said radar system to be trained together with one of said antennas and having a shutter of a given shutter delay, said discriminator of said missile-echo channel being connected with said shutter so as to be released by the single issuing from said latter discriminator in response to occurrence of time coincidence when the missile echo passes through said missile-echo gate.

9. An apparatus according to claim 8, said means for varying the time spacing of said two gates comprising a computer responsive to the instantaneous values of target and missile speeds for continuously computing said relative target-missile speed, said phase shift means being connected to said computer to vary the amount of said time spacing in dependence upon the computer output.

10. Apparatus for measuring misdistance when shooting at moving aerial targets, comprising an automatic tracking radar system having two directional antennas displaced from each other a given lateral angle and trained at the target and in the shooting direction respectively when in operation, radar pulse transmitter means connected with said two antennas for simultaneous pulse issuance therefrom, a first receiving channel for target echoes connected with said target-tracking antenna, a second receiving channel for missile echoes connected with said other antenna, coincidence gating means connected with said first channel for target tracking control of said target-tracking antenna, two range-gate and discriminator circuits connected with said second channel, phase-shift pulse means connecting said trans mitter means with said gating means of said first channel and with said two circuits of said second channel for opening the two gates of said second channel a fixed time spacing ahead of said first-channel gating means, a time measuring device connected with said two discriminators of second channel for issuing a signal indicative of the time interval between the time coincidences occurring in said two gates when the missile echo passes through, a camera for taking a picture of the target-missile constellation, said camera being connected with said other antenna so that the optical axis of said camera coincides with the sighting direction and having a releasable shutter of a given shutter delay, a timing stage of controllable time delay connected between said two circuits on the one hand and said shutter on the other hand for delayed release of said shutter in response to a signal indicative of the second-occurring time coincidence, and a computer imputwise connected with said two circuits and outputwise connected with said timing stage computing from said time interval the delay required up to the shutter release moment and automatically controlling signal delay in said timing stage.

References Cited in the file of this patent

UNITED STATES PATENTS

| | | |
|---|---|---|
| 2,843,028 | Ward et al. | July 15, 1958 |
| 2,938,201 | Thornton | May 24, 1960 |